(12) United States Patent
Miyazaki et al.

(10) Patent No.: US 11,397,365 B2
(45) Date of Patent: Jul. 26, 2022

(54) OPTICAL MODULATOR AND OPTICAL TRANSMISSION DEVICE

(71) Applicant: SUMITOMO OSAKA CEMENT CO., LTD., Tokyo (JP)

(72) Inventors: Norikazu Miyazaki, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 26 days.

(21) Appl. No.: 17/042,225

(22) PCT Filed: Feb. 1, 2019

(86) PCT No.: PCT/JP2019/003698
§ 371 (c)(1),
(2) Date: Sep. 28, 2020

(87) PCT Pub. No.: WO2019/187625
PCT Pub. Date: Oct. 3, 2019

(65) Prior Publication Data
US 2021/0026217 A1 Jan. 28, 2021

(30) Foreign Application Priority Data
Mar. 30, 2018 (JP) .............................. JP2018-067002

(51) Int. Cl.
*G02F 1/225* (2006.01)
*G02F 1/21* (2006.01)

(52) U.S. Cl.
CPC ............ *G02F 1/2255* (2013.01); *G02F 1/212* (2021.01); *G02F 2202/20* (2013.01)

(58) Field of Classification Search
CPC .......... G02F 1/011; G02F 1/025; G02F 1/065; G02F 1/2255; G02F 1/2257; G02F 1/035;
(Continued)

(56) References Cited

U.S. PATENT DOCUMENTS 5,099,399 A * 3/1992 Miller ...................... F21V 7/28
362/580
7,923,826 B2 * 4/2011 Takahashi ............... H01L 24/83
257/E23.101
(Continued)

FOREIGN PATENT DOCUMENTS

JP H07-36468 U 7/1995
JP H09-275245 A 10/1997
(Continued)

OTHER PUBLICATIONS

English translation of JP 2017-134241.*
International Search Report dated Apr. 9, 2019, 2 pages.

*Primary Examiner* — Robert Tavlykaev
(74) *Attorney, Agent, or Firm* — Rankin, Hill & Clark LLP (57) ABSTRACT

An optical modulator that can effectively dissipate heat generated from the inside includes: an optical modulation element which includes an optical waveguide and a radio frequency electrode for controlling light waves propagating through the optical waveguide; a termination resistor electrically connected to the radio frequency electrode; a termination resistor board on which the termination resistor is disposed; and a package case, which houses the optical modulation element and the termination resistor board, in which a plurality of protrusion portions are formed on one external surface of the package case, and at least one of the protrusion portions is formed at a position on the external surface of the package case, which faces a position inside the package case where the termination resistor board is disposed with the package case in between.

9 Claims, 11 Drawing Sheets (58) Field of Classification Search
CPC .............. G02F 1/212; G02F 2201/127; G02F 2202/20; G02B 2006/12142
USPC .................................... 385/1–3, 92
See application file for complete search history.

(56) References Cited

U.S. PATENT DOCUMENTS

| | | | |
|---|---|---|---|
| 9,964,690 B2* | 5/2018 | Jo | G02B 6/0073 |
| 10,165,669 B2* | 12/2018 | Kawagoe | H01L 25/167 |
| 2005/0281528 A1* | 12/2005 | Watanabe | G02B 6/4201 |
| | | | 385/135 |
| 2010/0243872 A1* | 9/2010 | Amano | H05K 1/021 |
| | | | 250/238 |
| 2013/0108204 A1* | 5/2013 | Takabayashi | G02F 1/035 |
| | | | 385/3 |
| 2015/0063743 A1* | 3/2015 | Katou | G02F 1/225 |
| | | | 385/3 |
| 2016/0334651 A1* | 11/2016 | Sugaya | G02B 6/12004 |
| 2017/0212402 A1* | 7/2017 | Ishii | H01R 9/0515 |

FOREIGN PATENT DOCUMENTS

| | | |
|---|---|---|
| JP | 2003-258363 | 9/2003 |
| JP | 2003-279907 A | 10/2003 |
| JP | 2017-134131 A | 8/2017 |
| JP | 2017-134241 A | 8/2017 |
| JP | 2019-124742 A | 7/2019 |
| JP | 2019-124743 A | 7/2019 |
| JP | 2019-148748 A | 9/2019 |

\* cited by examiner

OPTICAL MODULATOR AND OPTICAL TRANSMISSION DEVICE

TECHNICAL FIELD

The present invention relates to an optical modulator and an optical transmission device using the optical modulator.

BACKGROUND ART

In recent years, a digital coherent transmission technique, which has been started to be applied to long-distance optical communication, is also being applied to metro optical communication such as medium-distance and short-distance due to a further increase in communication demand. In such digital coherent transmission, a DP-QPSK (Dual Polarization-Quadrature Phase Shift Keying) modulator using a LiNbO$_3$ (hereinafter referred to as LN) substrate is typically used as an optical modulator. Hereinafter, an optical modulator using a LiNbO$_3$ substrate will be referred to as an LN modulator.

Such an optical modulator is connected to a driver element (or a drive circuit) that outputs an electric signal for causing the optical modulator to perform a modulation operation, to be used, for example, as an optical transmission device. Further, generally, the optical modulator or the driver element is disposed on a circuit board.

In particular, with regard to optical transmission devices for short-distance applications such as metro optical communication, there is a strong demand for a reduction of an installation space for an optical modulator, a driver circuit, or the like, and downsizing of a modulator or the like is desired. In order to downsize the optical modulator, efforts such as downsizing of an LN optical modulation element (for example, a reduction of an optical waveguide disposition area on an LN substrate), downsizing of a space optical system for optically coupling output light from an optical waveguide on an LN substrate to an output optical fiber, and downsizing of a radio frequency (RF) signal input interface of an LN modulator (for example, a change from a coaxial connector to a flexible printed board) have been performed in the related art.

Further, in addition to the downsizing of the optical modulator alone as described above, a configuration in which a protrusion portion is provided at a limited portion of the bottom surface of an optical modulator package case and electronic components such as a driver element are disposed in a space secured by the protrusion portion has been proposed (Patent Literature Nos. 1, 2, and 3).

However, in such an optical modulator, if a package case of the optical modulator is downsized and a space utilization rate (accordingly, a space occupancy rate of devices or the like including an optical modulator) or integration in an optical transmission device is increased, it becomes difficult to effectively dissipate heat generated from the inside of the optical modulator. For example, in an LN modulator provided with a traveling waveguide electrode, it is necessary to dissipate heat generated in a termination resistor connected to the traveling waveguide electrode to the outside of a modulator package case. However, if the heat capacity of the package case decreases according to the downsizing of the modulator package case, the heat generation may cause a non-negligible temperature rise in the package case.

As a result, an event such as a change in the characteristics of the termination resistor or a decrease in reliability occurs in the optical modulator, and there is a concern that the optical transmission device may also be greatly affected in terms of transmission characteristics or reliability.

In particular, in the modulator of DP-QPSK or the like which is operated by input of a plurality of radio frequency signals and has a plurality of termination resistors serving as heat generation bodies, a rise in operating temperature due to the downsizing as described above, an increase in space utilization rate or integration in the optical transmission device, and radio frequency drivers that are heat generation bodies being disposed close to each other in the optical transmission device may be significant.

In particular, in the DP-QPSK modulator which is operated by input of a plurality of radio frequency signals and has a plurality of termination resistors serving as heat generation bodies, a rise in operating temperature due to the downsizing as described above, or radio frequency drivers being disposed close to each other in the optical transmission device may be significant.

CITATION LIST

Patent Literature

[Patent Literature No. 1] Japanese Patent Application No. 2018-003442
[Patent Literature No. 2] Japanese Patent Application No. 2018-003443
[Patent Literature No. 3] Japanese Patent Application No. 2018-034768

SUMMARY OF INVENTION

Technical Problem

From the above background, it is desired to realize an optical modulator that can effectively dissipate heat generated from the inside of the optical modulator.

Solution to Problem

According to an aspect of the present invention, there is provided an optical modulator including: an optical modulation element which includes an optical waveguide and a radio frequency electrode for controlling light waves propagating through the optical waveguide; a termination resistor electrically connected to the radio frequency electrode; a termination resistor board on which the termination resistor is disposed; and a package case which houses the optical modulation element and the termination resistor board, in which a plurality of protrusion portions are formed on one external surface of the package case, and at least one of the protrusion portions is formed at a position on the external surface of the package case, the position opposite to a position inside the package case where the termination resistor board is disposed with the package case in between.

According to another aspect of the present invention, at least one of the protrusion portions is formed at a position on the external surface of the package case, the position opposite to a position of the termination resistor disposed on the termination resistor board inside the package case with the termination resistor board and the package case in between.

According to another aspect of the present invention, the protrusion portion is made of a material having a lower thermal resistance value than the package case.

According to another aspect of the present invention, another external surface of the package case, which is adjacent to the one external surface, has a protrusion portion or a recess portion.

According to another aspect of the present invention, at least one of the protrusion portions is provided with a screw hole.

According to another aspect of the present invention, there is provided an optical transmission device including the optical modulator according to any one of the above aspects.

According to another aspect of the present invention, in the optical transmission device, the optical modulator is mounted such that anyone of the protrusion portions is in contact with a conductor pattern formed on a substrate on which an electronic component is mounted.

According to another aspect of the present invention, there is provided an optical transmission device including the optical modulator provided with the screw holes, in which the optical modulator is mounted such that any one of screws connected to the screw holes is in contact with a conductor pattern formed on a back surface of a substrate on which an electronic component is mounted.

This specification includes all the contents of Japanese Patent Application No. 2018-067002 filed on Mar. 30, 2018.

Advantageous Effects of Invention

According to the present invention, it is possible to realize an optical modulator that can effectively dissipate heat generated from the inside of the optical modulator.

DESCRIPTION OF EMBODIMENTS

Hereinafter, embodiments of the present invention will be described with reference to the drawings.

First Embodiment

Figure 1:
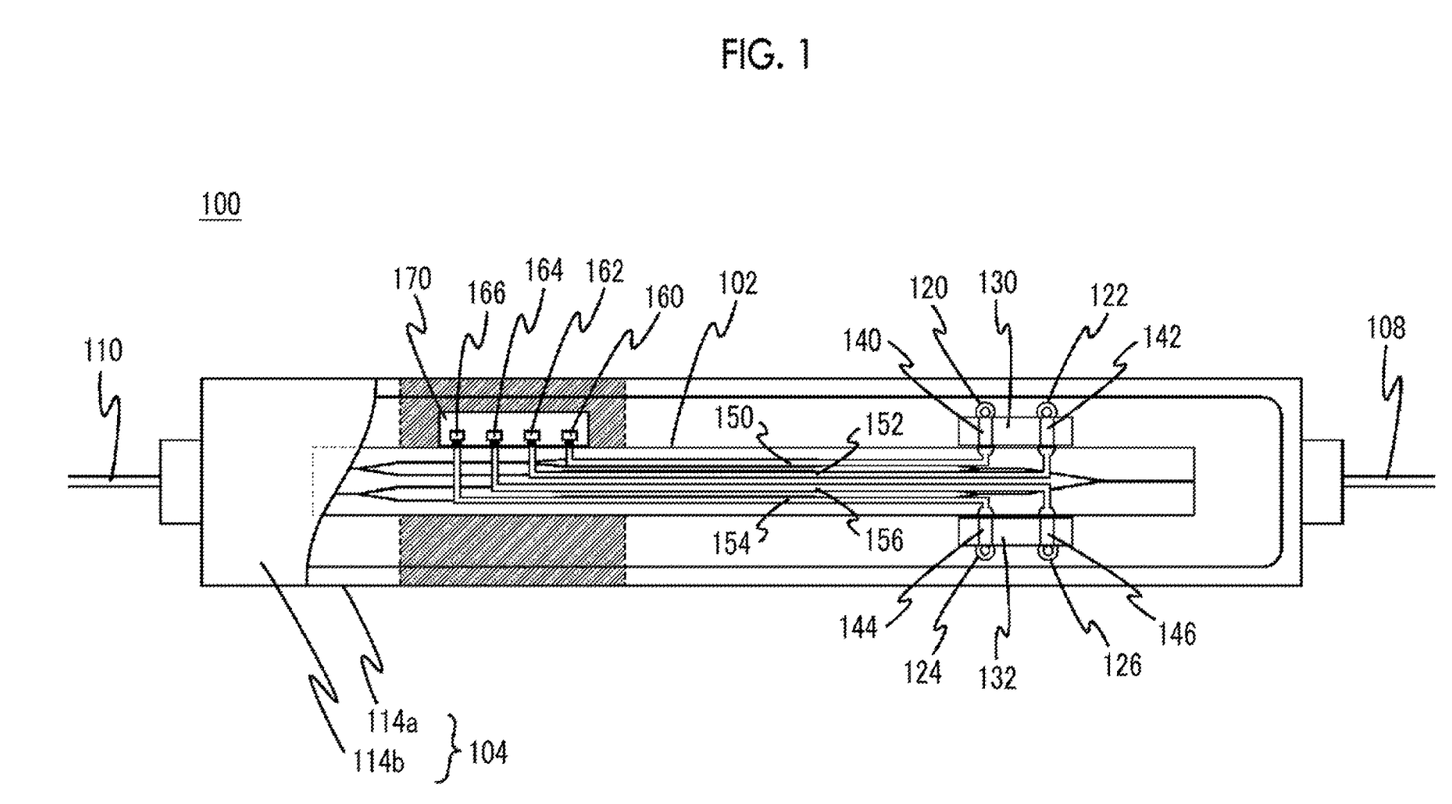
FIG. 1 is a plan view of an optical modulator according to a first embodiment of the present invention.
Figure 2:
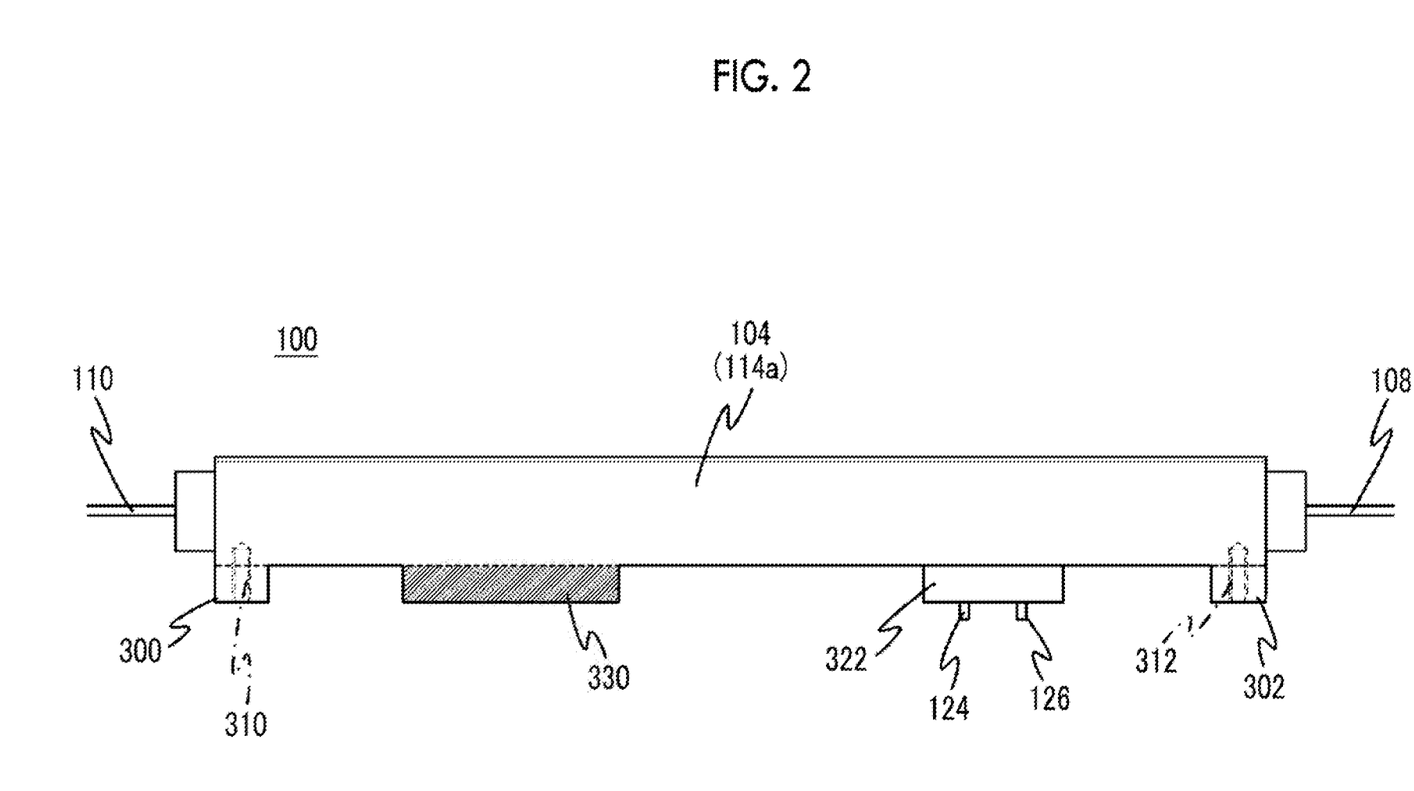
FIG. 2 is a side view of the optical modulator shown in FIG. 1.
Figure 3:
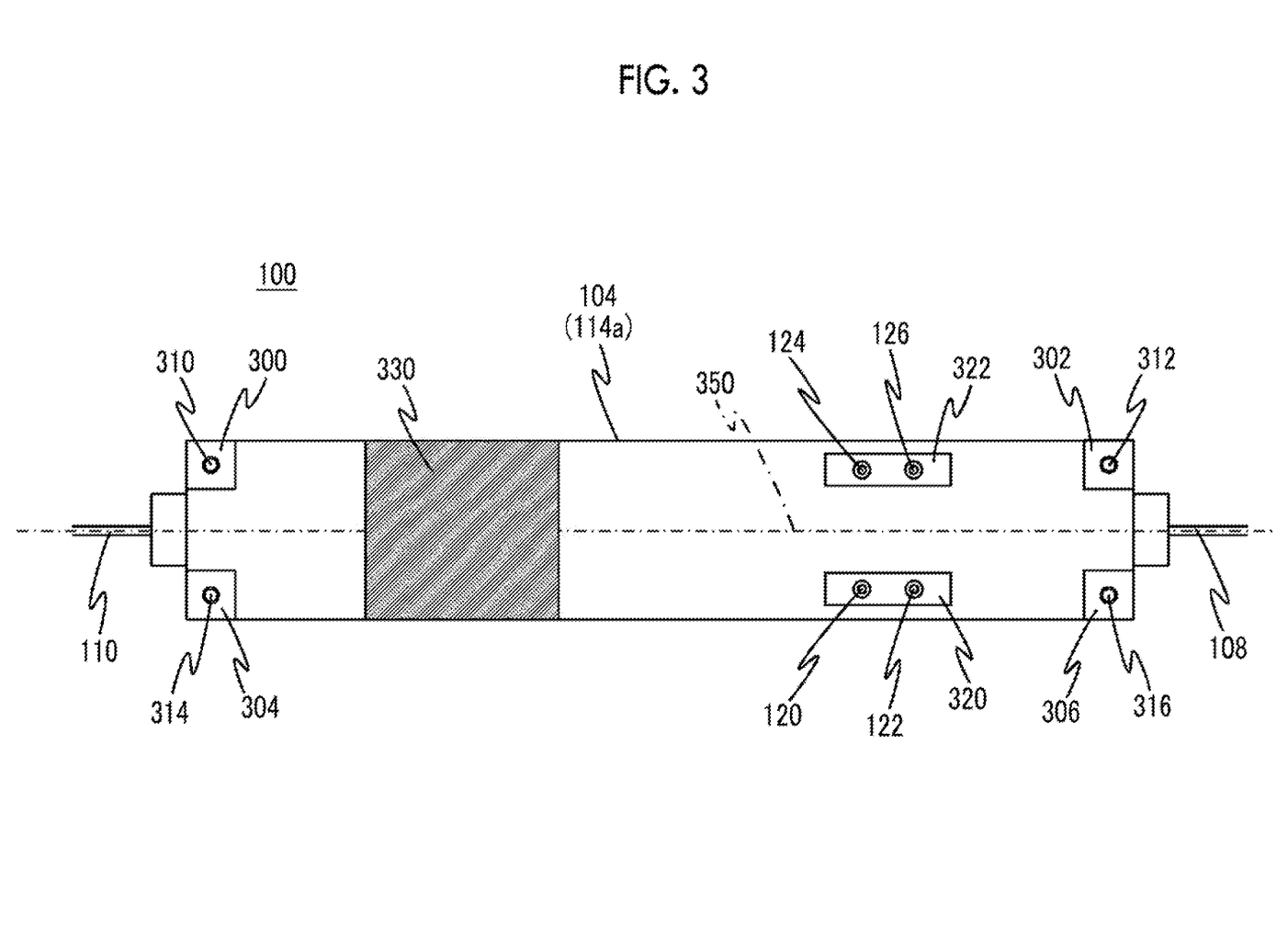
FIG. 3 is a bottom view of the optical modulator shown in FIG. 1.

FIG. 1 is a plan view showing the configuration of an optical modulator 100 according to a first embodiment of the present invention, FIG. 2 is a side view of the optical modulator 100, and FIG. 3 is a bottom view of the optical modulator 100. The optical modulator 100 is mounted on, for example, an external circuit board (for example, a circuit board 400 shown in FIG. 4 described later) on which an electric circuit for causing the optical modulator 100 to perform modulation is configured, and is used by being electrically connected to the electric circuit.

The optical modulator 100 includes an optical modulation element 102, a package case 104 that houses the optical modulation element 102, an optical fiber 108 for inputting light to the optical modulation element 102, and an optical fiber 110 that leads the light that is output from the optical modulation element 102 to the outside of the package case 104.

The optical modulation element 102 is a DP-QPSK optical modulator that includes four Mach-Zehnder type optical waveguides provided on an LN substrate, for example, and four RF electrodes (radio frequency electrodes) 150, 152, 154, and 156 that are respectively provided on the Mach-Zehnder type optical waveguides to modulate light waves propagating in the optical waveguides. Two lights that are output from the optical modulation element 102 are polarization-combined by, for example, a lens optical system (not shown) and led to the outside of the package case 104 through the optical fiber 110.

The package case 104 is composed of a case 114a to which the optical modulation element 102 is fixed, and a cover 114b. In order to facilitate understanding of the configuration inside the package case 104, in FIG. 1, only a part of the cover 114b is shown on the left side of the drawing. However, in fact, the cover 114b is disposed so as to cover the entirety of the box-shaped case 114a and hermetically seals the inside of the package case 104.

The case 114a is provided with four lead pins 120, 122, 124, and 126 that are signal input terminals for radio frequency signal input. The lead pins 120, 122, 124, and 126 extend outward from the bottom surface (the surface shown in FIG. 3) of the package case 104.

Further, the case 114a is made of a conductive material (for example, metal such as stainless steel, or a material coated with a thin metal film such as gold). Then, for example, when the optical modulator 100 is mounted on an external structure such as a circuit board, the case 114a and the external structure come into contact with each other, whereby the case 114a is connected to a ground line.

In this embodiment, the four lead pins 120, 122, 124, and 126 which are signal input terminals are disposed, for example, on the sides facing each other with the optical modulation element 102 in between. The four lead pins 120, 122, 124, and 126 are respectively electrically connected to one ends of RF electrodes 150, 152, 154, and 156 through conductor patterns 140, 142, 144, and 146 on relay boards 130 and 132. The conductor patterns 140, 142, 144, and 146 and the RF electrodes 150, 152, 154, and 156 are electrically connected to each other by, for example, gold (Au) wires.

Each of the RF electrodes 150, 152, 154, and 156 is designed such that the characteristic impedance thereof has a predetermined value in an operating frequency range. Further, the other ends of the RF electrodes 150, 152, 154, and 156 are respectively electrically connected to and terminated by termination resistors 160, 162, 164, and 166 having impedance of the same value as the characteristic impedance.

The termination resistors 160, 162, 164, and 166 are mounted on a termination resistor board 170 which is a substrate made of ceramic or the like. Further, the termination resistor board 170 is fixed to the inner surface of the case 114a of the package case 104. The mounting of the termination resistors 160, 162, 164, and 166 on the termination resistor board 170 and the fixing of the termination resistor board 170 to the case 114a can be performed using, for example, a good thermally-conductive material such as solder or conductive paste.

At four corners of the bottom surface of the package case 104, that is, the bottom surface (the surface shown in FIG. 3) of the case 114a, protrusion portions 300, 302, 304, and 306 having the same height from the bottom surface are provided. The bottom surface of each of the protrusion portions 300, 302, 304, and 306 is flat, and screw holes 310, 312, 314, and 316 for fixing the package case 104 to an external structure are respectively provided on the bottom surfaces of the protrusion portions 300, 302, 304, and 306. Further, the protrusion portions 300, 302, 304, and 306 are disposed, for example, at positions substantially symmetrical with respect to a center line 350 in the width direction of the bottom surface of the package case 104, from the viewpoint of reducing strain generation during processing of the package case 104.

Further, the lead pins 120 and 122 are provided on a protrusion portion 320 having the same height as the protrusion portions 300 and the like from the bottom surface of the case 114a, and the lead pins 124 and 126 are provided on a protrusion portion 322 having the same height as the protrusion portions 300 and the like from the bottom surface of the case 114a.

In particular, in the optical modulator 100 according to this embodiment, a protrusion portion 330 is disposed so as to be opposite to the position inside the package case 104 where the termination resistor board 170 is disposed, with the bottom surface of the package case 104 in between. The protrusion portion 330 has the same height as the other protrusion portions 300 and the like and protrusion portions 320 and the like, and transmits heat generated from the termination resistors 160, 162, 164, and 166 and transmitted through the termination resistor board 170 to the circuit board to dissipate the heat, when the package case 104 is fixed to the circuit board. Further, the surface area of the package case 104 increases due to the protrusion portion 330, and thus the heat dissipation from the package case 104 is also promoted.

The expression "the protrusion portion 330 is disposed so as to be opposite to the position inside the package case 104 where the termination resistor board 170 is disposed with the bottom surface of the package case 104 in between" in the present invention means to include not only the disposition in which the entire termination resistor board 170 overlaps the protrusion portion 330, but also the disposition in which at least a part of the protrusion portion 330 overlaps the termination resistor board 170, when transparently viewed from the upper surface side of the package case 104 in FIG. 1 (transparently viewed from above the plane of the drawing).

In this way, in the optical modulator 100, it is possible to efficiently dissipate the heat generated from the termination resistors 160, 162, 164, and 166, which are heat generation bodies which are mounted inside the optical modulator 100, to the outside of the package case 104. The protrusion portion 330 can be formed by cutting out the package case 104 made of, for example, stainless steel. Alternatively, the protrusion portion 330 may be provided by fixing another member made of a material having a lower thermal resistance value than the package case of the optical modulator (for example, a copper tungsten alloy (CuW) or aluminum Al) to the package case 104 by brazing or the like. In particular, it is preferable that the protrusion portion 330 which is provided below the termination resistors 160 and the like (a depth direction in the plane of the drawing in FIG. 1 is regarded as a lower side) is made of a member having a lower thermal resistance value (higher thermal conductivity) as the amount of heat generated in the termination resistors 160 and the like increases. In this way, it is possible to prevent the heat from the termination resistors 160 and the like from diffusing to the portions of the package case 104 other than the protrusion portion 330, and quickly lead the heat to the outside of the package case 104. Further, the outer surface of the protrusion portion 330 may have irregularities, which allow more efficient heat dissipation.

Figure 4:
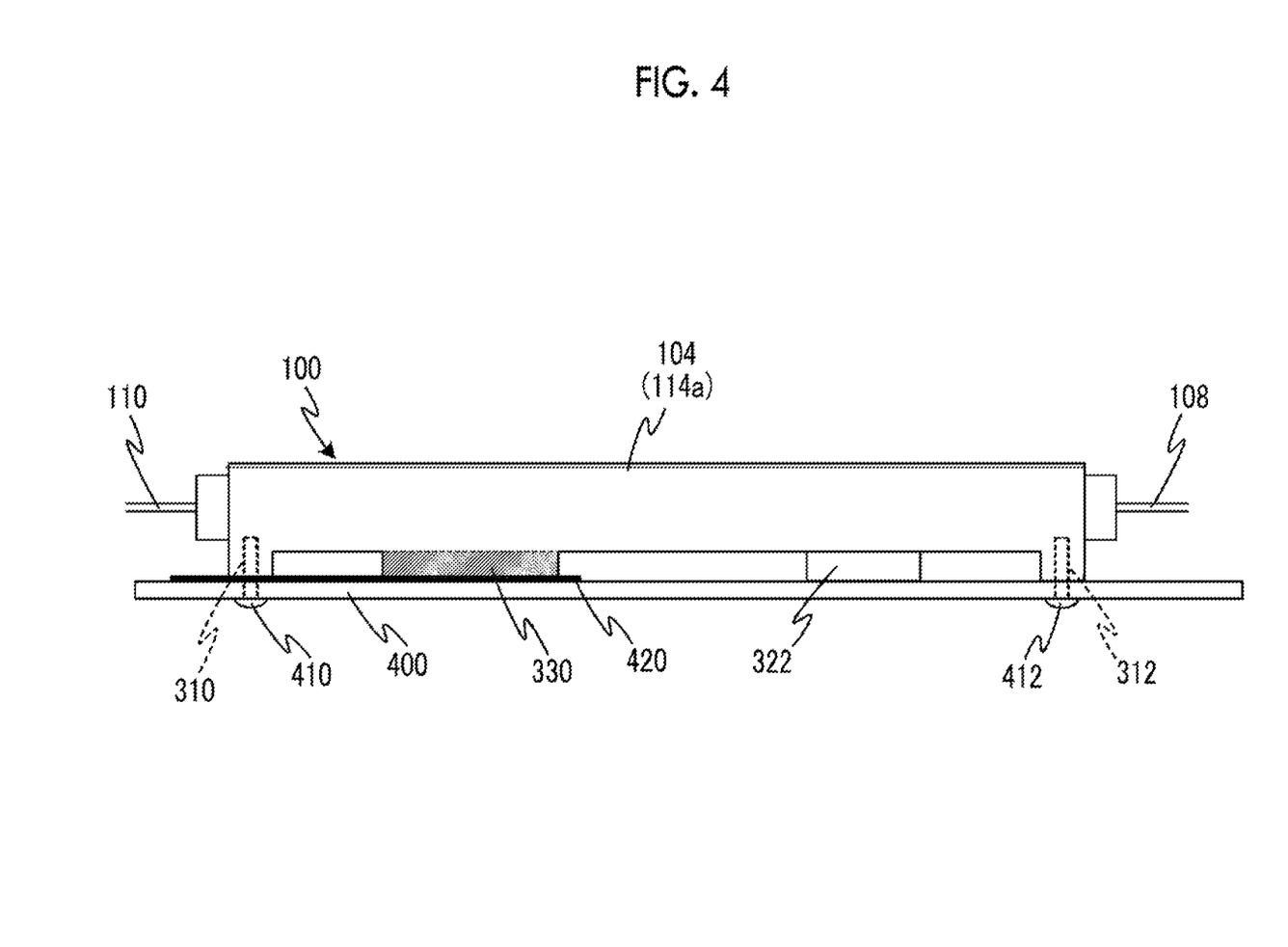
FIG. 4 is a diagram showing an example of mounting of the optical modulator shown in FIG. 1 on a circuit board.

FIG. 4 is a diagram showing an example of mounting of the optical modulator 100 on a circuit board. In the illustration, the optical modulator 100 is fastened and fixed to a circuit board 400 with four screws 410, 412, and the like (the other two screws are not shown) by using the four screw holes 310, 312, and the like of the package case 104.

A conductor pattern 420 is formed at the position on the circuit board 400, with which the protrusion portion 330 of the package case 104 comes into contact. The heat generated from the termination resistors 160, 162, 164, and 166 in the optical modulator 100 is efficiently dissipated to the conductor pattern 420 on the circuit board 400 through the termination resistor board 170 and the protrusion portion 330. Further, the protrusion portion 330 and the conductor pattern 420 on the circuit board 400 come into contact with each other, whereby heat-generation electronic components such as a radio frequency driver cannot be disposed at the position on the circuit board 400 below the termination resistors 160 and the like, which are heat generation bodies, or below the termination resistor board 170. Therefore, the termination resistors 160 and the like and the heat-generation electronic components such as a radio frequency driver are disposed in a distributed manner in a mounting space, and thus it is possible to suppress uneven distribution of these heat-generation components and improve heat dissipation.

A good thermal conductor (for example, a thermally-conductive silicone rubber adhesive, a thermally-conductive epoxy adhesive, or the like) can be inserted between the protrusion portion 330 and the circuit board 400 to enhance thermal contact efficiency and enhance thermal conductivity.

Further, the conductor pattern 420 may be, for example, a ground pattern or an independent heat dissipation conductor pattern for heat dissipation, which does not configure an electric circuit. Further, it is desirable that the conductor pattern 420 with which the protrusion portion 330 comes into contact is thermally connected to the package case of the device through screws (not shown) or the like for fixing the circuit board 400 to the inside of the device (not shown), for example. In this way, the device also functions as a heat dissipation part, and therefore, the efficiency of heat dissipation can be further improved.

In the optical modulator 100 described above, one protrusion portion 330 is provided at the position on a bottom surface of the package case 104, the position opposite to the position inside the package case 104 where the termination resistor board 170 is disposed with the bottom portion of the package case 104 in between. However, there is no limitation thereto. For example, instead of the protrusion portion 330, a plurality of protrusion portions may be provided in the region where the protrusion portion 330 is formed in FIG. 3. That is, at least one protrusion portion for performing heat dissipation may be provided at the position on the bottom surface of the package case, the position opposite to the position inside the package case where the termination resistor board is disposed with the package case (the bottom portion thereof) in between.

Further, for example, the protrusion portion may be composed of a plurality of protrusion portions respectively disposed at the positions on the external surface (for example, the bottom surface) of the package case 104, the positions opposite to the respective positions of the plurality of termination resistors 160 and the like disposed on the termination resistor board 170 in the package case, with the termination resistor board 170 and the package case 104 in between.

Like the protrusion portion 300 described above, such a plurality of protrusion portions can be made of a material (for example, CuW or Al) having a lower thermal resistance value than the package case of the optical modulator. The expression "opposite to the respective positions of the plurality of termination resistors 160 and the like disposed on the termination resistor board 170 in the package case, with the termination resistor board 170 and the package case 104 in between" in the present invention means to include not only the disposition in which all the plurality of termination resistors 160 and the like overlap the protrusion portion 330, but also the disposition in which at least some of the plurality of termination resistors 160 and the like overlap the protrusion portion 330, when transparently viewed from the upper surface side of the package case 104 in FIG. 1 (transparently viewed from above the plane of the drawing).

Next, modification examples of the optical modulator 100 will be described.

First Modification Example

Figure 5:
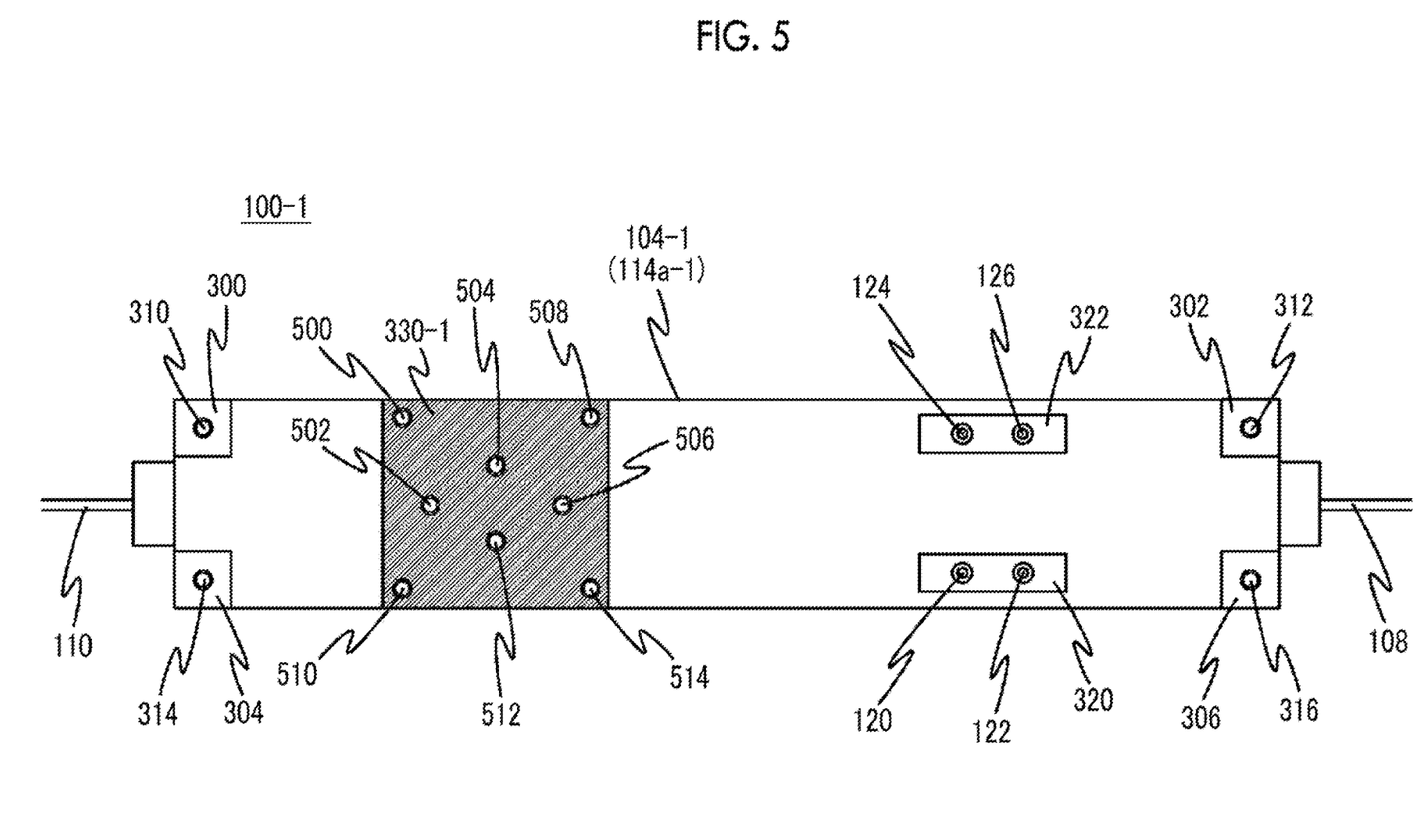
FIG. 5 is a bottom view of an optical modulator according to a first modification example.

An optical modulator 100-1 according to a first modification example has the same configuration as the optical modulator 100 except that the configuration of the bottom surface of the package case is different. FIG. 5 is a diagram showing the configuration of the bottom surface of the optical modulator 100-1 and is a diagram corresponding to the bottom view of the optical modulator 100 shown in FIG. 3. In FIG. 5, the same constituent elements as the constituent elements shown in FIG. 3 are designated by the same reference numerals as those in FIG. 3. Further, in FIG. 5, with respect to the other constituent elements except for the constituent elements denoted by reference numerals different from those in FIG. 3, the description in FIGS. 1, 2, and 3 described above is incorporated by reference.

The optical modulator 100-1 has substantially the same configuration as the optical modulator 100 except that the optical modulator 100-1 is provided with a package case 104-1 which is composed of a case 114*a*-1 and the cover 114*b*, instead of the package case 104 which is composed of the case 114*a* and the cover 114*b*. The case 114*a*-1 has the same configuration as the case 114*a* except that the case 114*a*-1 has a protrusion portion 330-1 having screw holes 500, 502, 504, 506, 508, 510, 512, and 514, instead of the protrusion portion 330.

In this way, in the optical modulator 100-1, the protrusion portion 330-1 is brought into contact with an external circuit board with better adhesion than the protrusion portion 330 by the screws that are fitted into the screw holes 500, 502, 504, 506, 508, 510, 512, and 514, and thus it is possible to enhance the thermal conductivity from the protrusion portion 330-1 to the circuit board. Further, the heat transmitted from the inside of the package case 104-1 to the protrusion portion 330-1 can be transmitted to the rear surface of an external circuit board (that is, the surface facing the surface on which the optical modulator 100-1 is mounted) through the screws which are fastened to the screw holes 500, 502, 504, 506, 508, 510, 512, and 514 to dissipate the heat.

Figure 6:
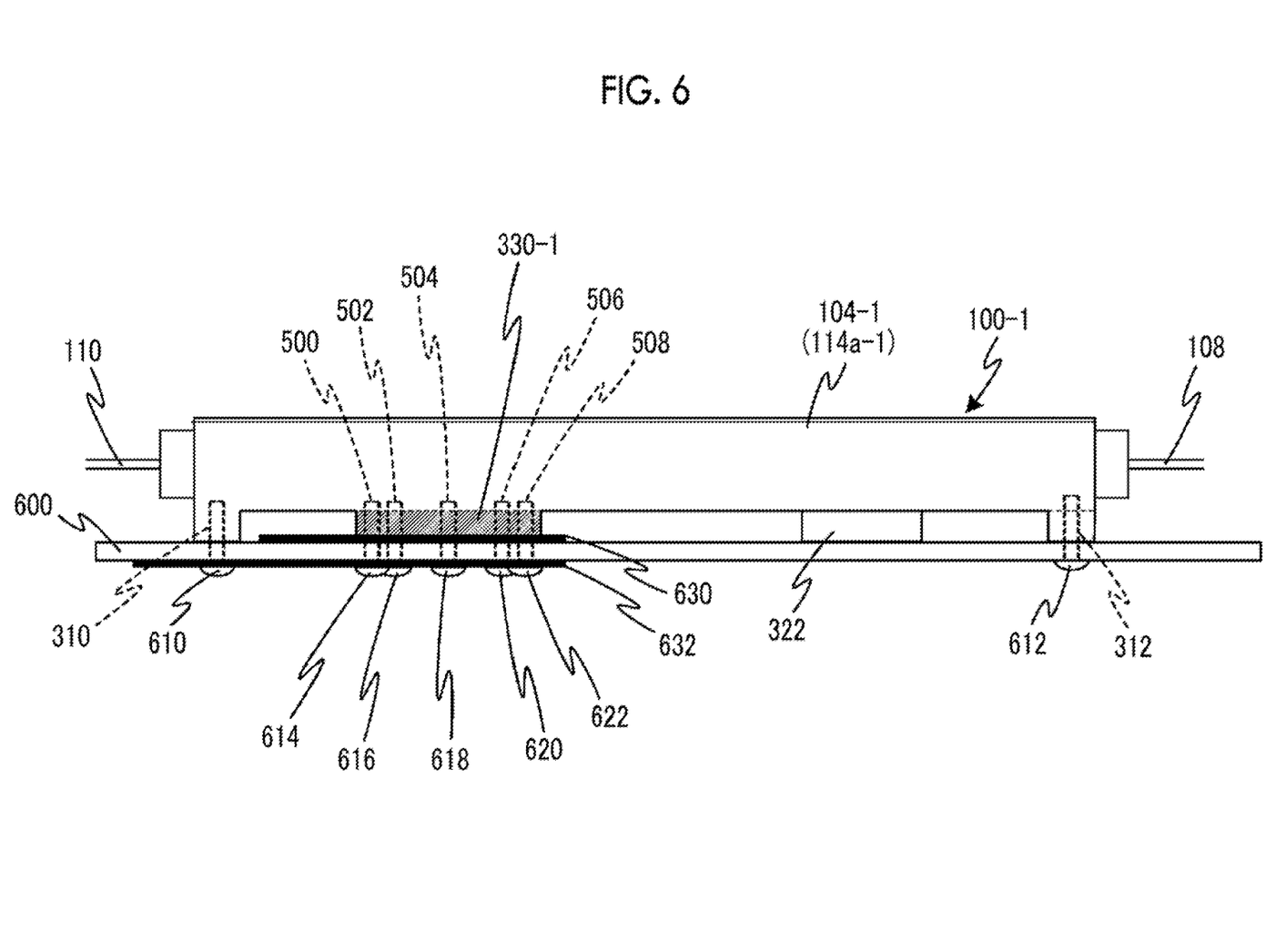
FIG. 6 is a diagram showing an example of mounting of the optical modulator according to the first modification example on the circuit board.

FIG. 6 is a diagram showing an example of mounting of the optical modulator 100-1 on the circuit board. In FIG. 6, the optical modulator 100-1 is fastened to the upper surface (front surface) of a circuit board 600 in the drawing by twelve screws 610, 612, 614, 616, 618, 620, 622, and the like (the other two screws are not shown) by using the eight screw holes 500 and the like provided in the protrusion portion 330-1, in addition to the four screw holes 310, 312, and the like of the package case 104-1.

Due to the screw-fastening using the screw holes 500 and the like provided in the protrusion portion 330-1, the adhesion between the protrusion portion 330-1 and a conductor pattern 630 formed on the front surface of the circuit board 600 is increased and the heat dissipation from the protrusion portion 330-1 to the conductor pattern 630 is improved. Further, the heat of the protrusion portion 330-1 is also dissipated to a conductor pattern 632 formed on the rear surface of the circuit board 600 through the screws 614 and the like fastened to the screw holes 500 and the like, and therefore, the heat dissipation effect is further improved. Even if the conductor pattern 632 is not formed on the rear surface of the circuit board 600, the adhesion with the conductor pattern 630 formed on the front surface of the circuit board 600 is improved, and thus a certain heat dissipation effect can be obtained.

The screws 614 and the like that are fastened to the screw holes 500 and the like provided in the protrusion portion 330-1 may have the main purpose of fixing the optical modulator 100-1. However, it may have the main purpose of improving the adhesion between the protrusion portion 330-1 and the conductor pattern 630 and leading the heat of the protrusion portion 330-1 to the conductor pattern 632. In this case, the number of screw holes 500 and the like provided in the protrusion portion 330-1 or the size of the diameter of the screw hole may be more than eight or may be a size that fits into a screw having a larger diameter, in accordance with the above purposes.

In this modification example, the heat generated from the termination resistors 160 and the like is dissipated by the one protrusion portion 330-1 provided with the screw holes 500 and the like. However, there is no limitation thereto. As described above, the protrusion portion 330-1 may be composed of a plurality of protrusion portions (for example, a plurality of protrusion portions provided at the positions which are respectively opposite to the termination resistors 160 and the like with the package case 104-1 in between). In this case, a screw hole may be provided in at least one of the protrusion portions configuring the protrusion portion 330-1.

Second Modification Example

Figure 7:
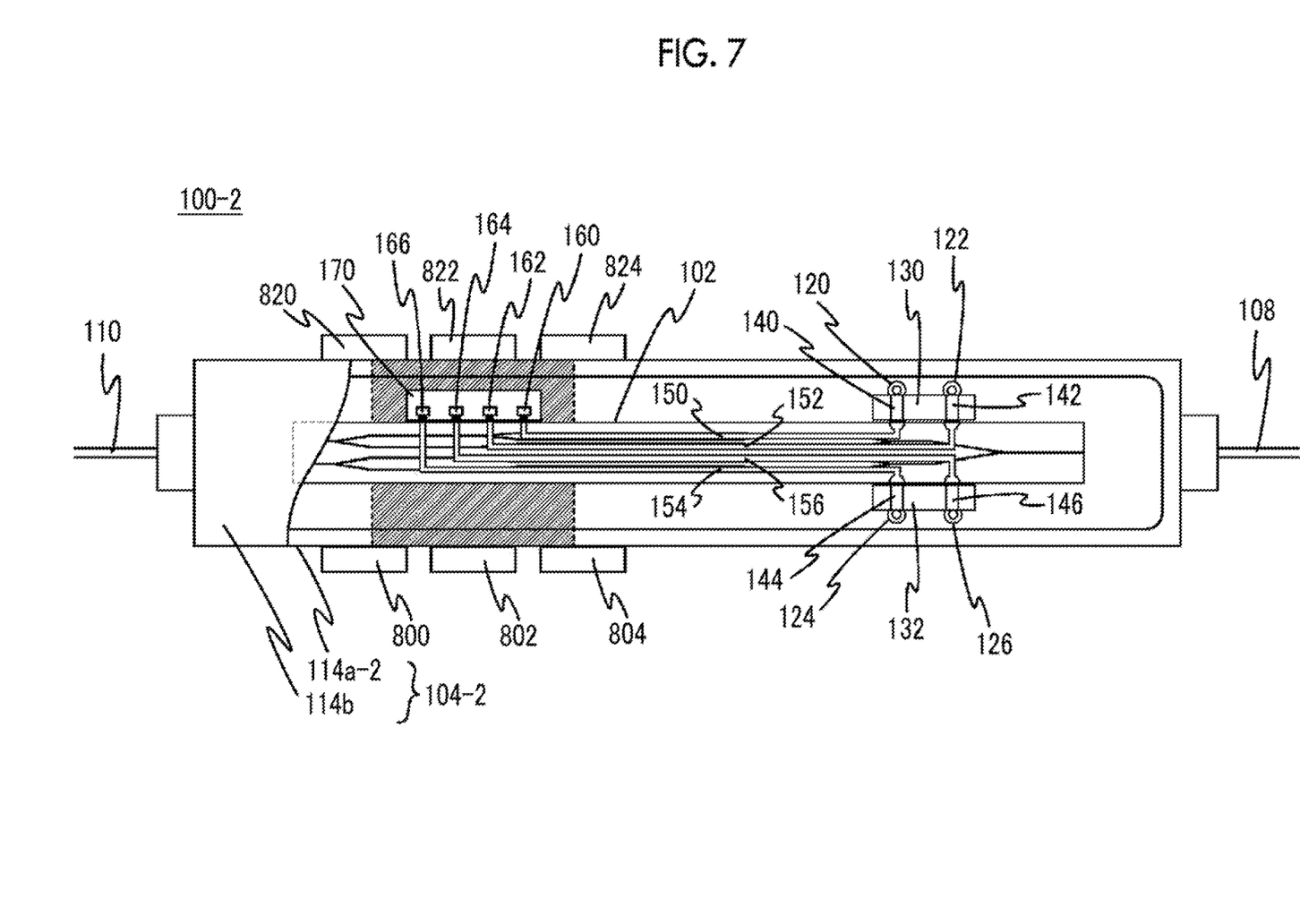
FIG. 7 is a plan view of an optical modulator according to a second modification example.
Figure 8:
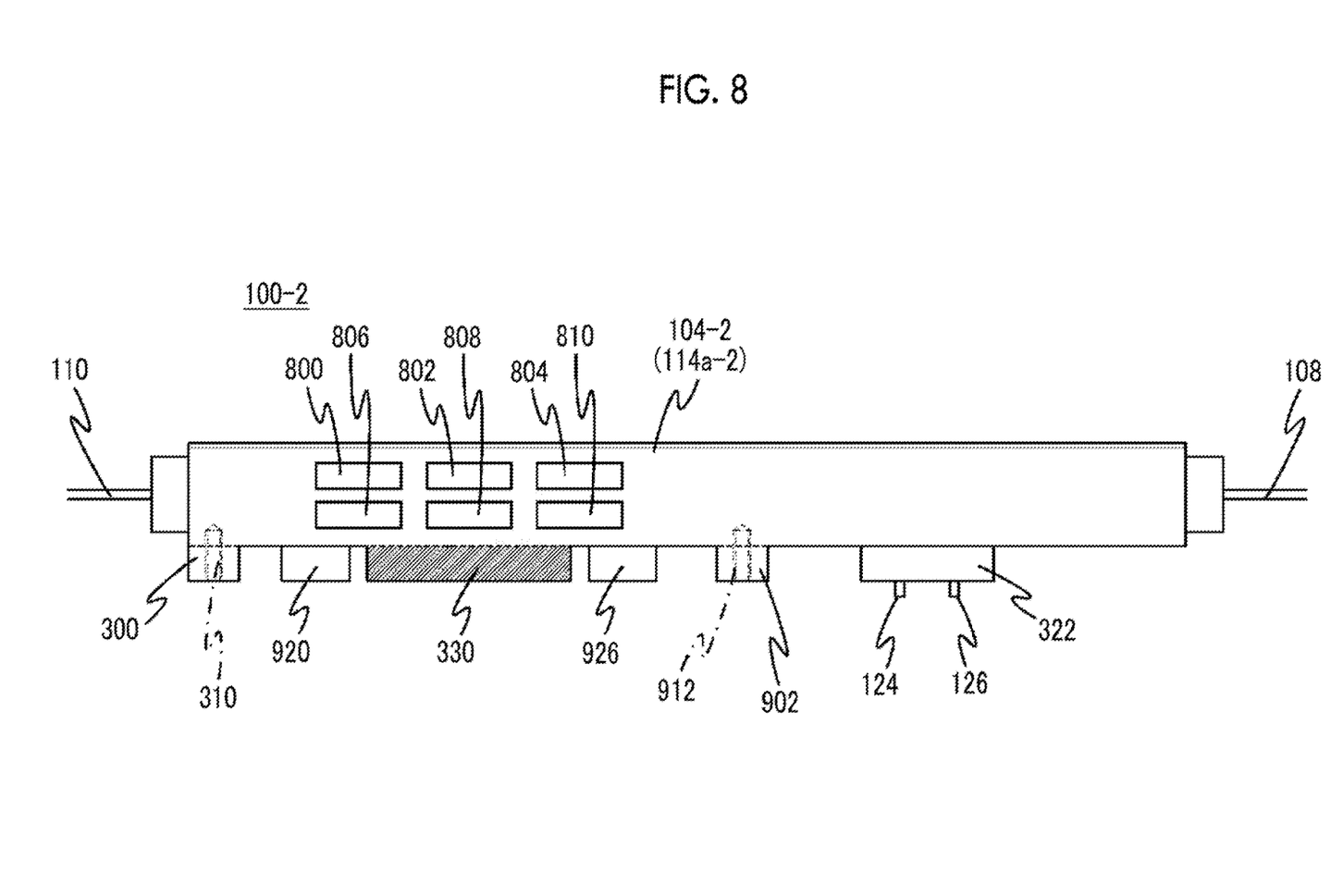
FIG. 8 is a side view of the optical modulator according to the second modification example.
Figure 9:
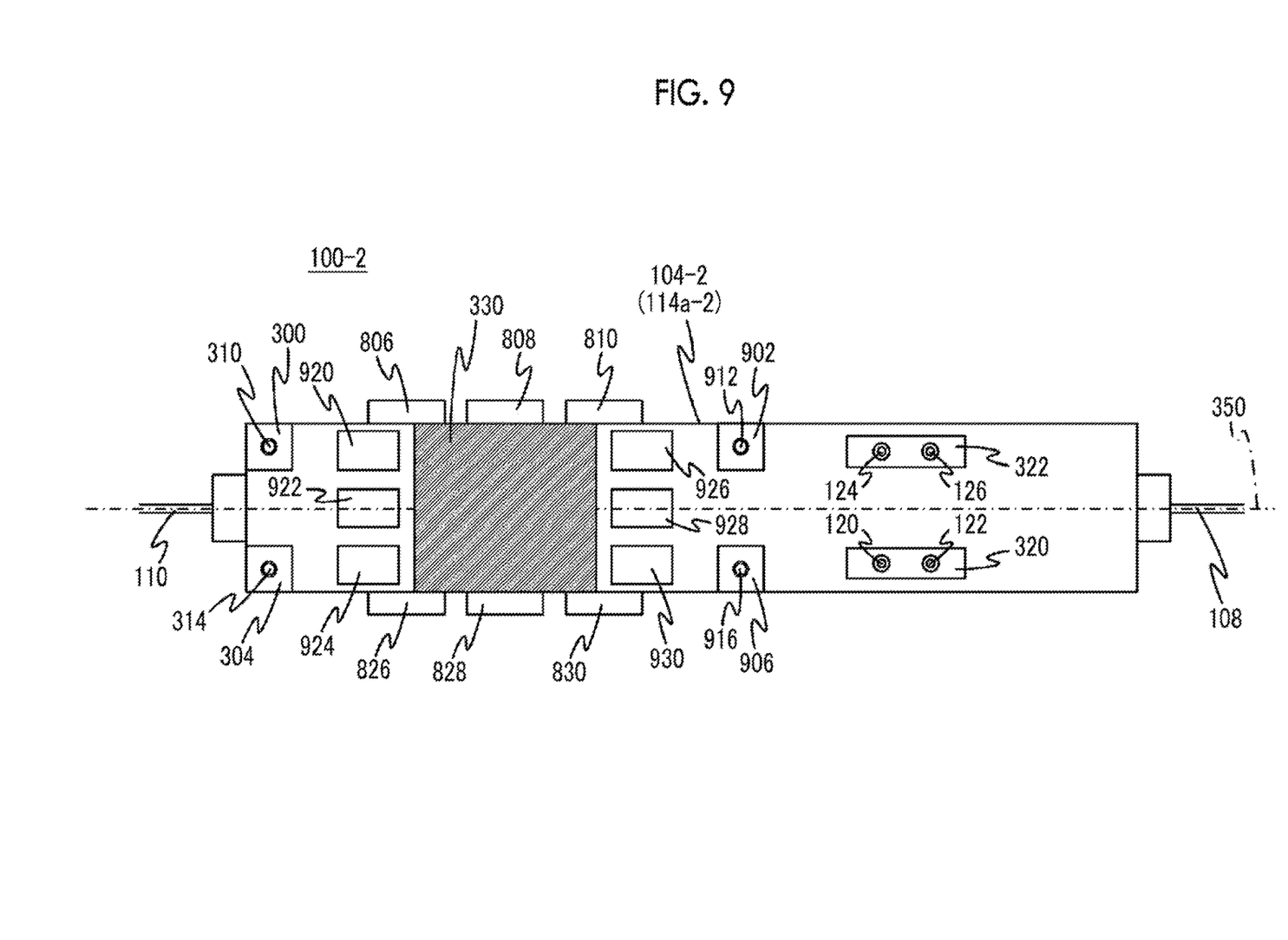
FIG. 9 is a bottom view of the optical modulator according to the second modification example.

An optical modulator 100-2 according to a second modification example has the same configuration as the optical modulator 100 except that the configuration of the case of the package case is different. FIGS. 7, 8, and 9 respectively are a plan view, a side view, and a bottom view of the optical modulator 100-2 and are diagrams corresponding to the plan view, the side view, and the bottom view of the optical modulator 100 shown in FIGS. 1, 2, and 3. In FIGS. 7, 8, and 9, the same constituent elements as the constituent elements shown in FIGS. 1, 2, and 3 are denoted by the same reference numerals as those in FIGS. 1, 2, and 3, and the description in FIGS. 1, 2, and 3 described above is incorporated by reference.

The optical modulator 100-2 has substantially the same configuration as the optical modulator 100 except that the optical modulator 100-2 includes a package case 104-2 composed of a case 114a-2 and the cover 114b, instead of the package case 104 composed of the case 114a and the cover 114b. The case 114a-2 has substantially the same configuration as the case 114a except that the case 114a-2 is provided with protrusion portions 902 and 906 provided with screw holes 912 and 916 and disposed at the upper and lower sides of the central portion of the case 114a-2 in FIG. 9, instead of the protrusion portions 302 and 306 provided with the screw holes 312 and 316 and disposed at two corner portions on the right side of the case 114a in FIG. 3.

Further, the case 114a-2 includes, on the bottom surface of the case 114a-2 shown in FIG. 9, three protrusion portions 920, 922, and 924 provided along the left side of the protrusion portion 330 on the left side of the protrusion portion 330 in the drawing, and three protrusion portions 926, 928, and 930 provided along the right side of the protrusion portion 330 on the right side of the protrusion portion 330 in the drawing.

Further, the case 114a-2 includes six protrusion portions 800, 802, 804, 806, 808, and 810 provided around the protrusion portion 330 on the side surface shown in FIG. 8. Further, the case 114a-2 also includes six protrusion portions 820, 822, 824, 826, 828, and 830 provided at the positions facing the six protrusion portions 800, 802, 804, 806, 808, and 810, respectively, on the side surface (not shown) facing the side surface shown in FIG. 8.

In the optical modulator 100-2, the protrusion portions 920 and the like provided on the bottom surface of the package case 104-2 function as additional heat conductors for transmitting the heat generated within the package case 104-2 to the outside, in addition to the protrusion portion 330, and increase the surface area of the package case 104-2 to increase heat dissipation from the package case 104-2 to air. Further, the protrusion portions 820 and the like provided at the package case 104-2 act as radiation fins, and the entire package case 104-2 functions as a radiator. Therefore, it is possible to more efficiently dissipate the heat generated from the termination resistors 166 and the like in the package case 104-2.

Figure 10:
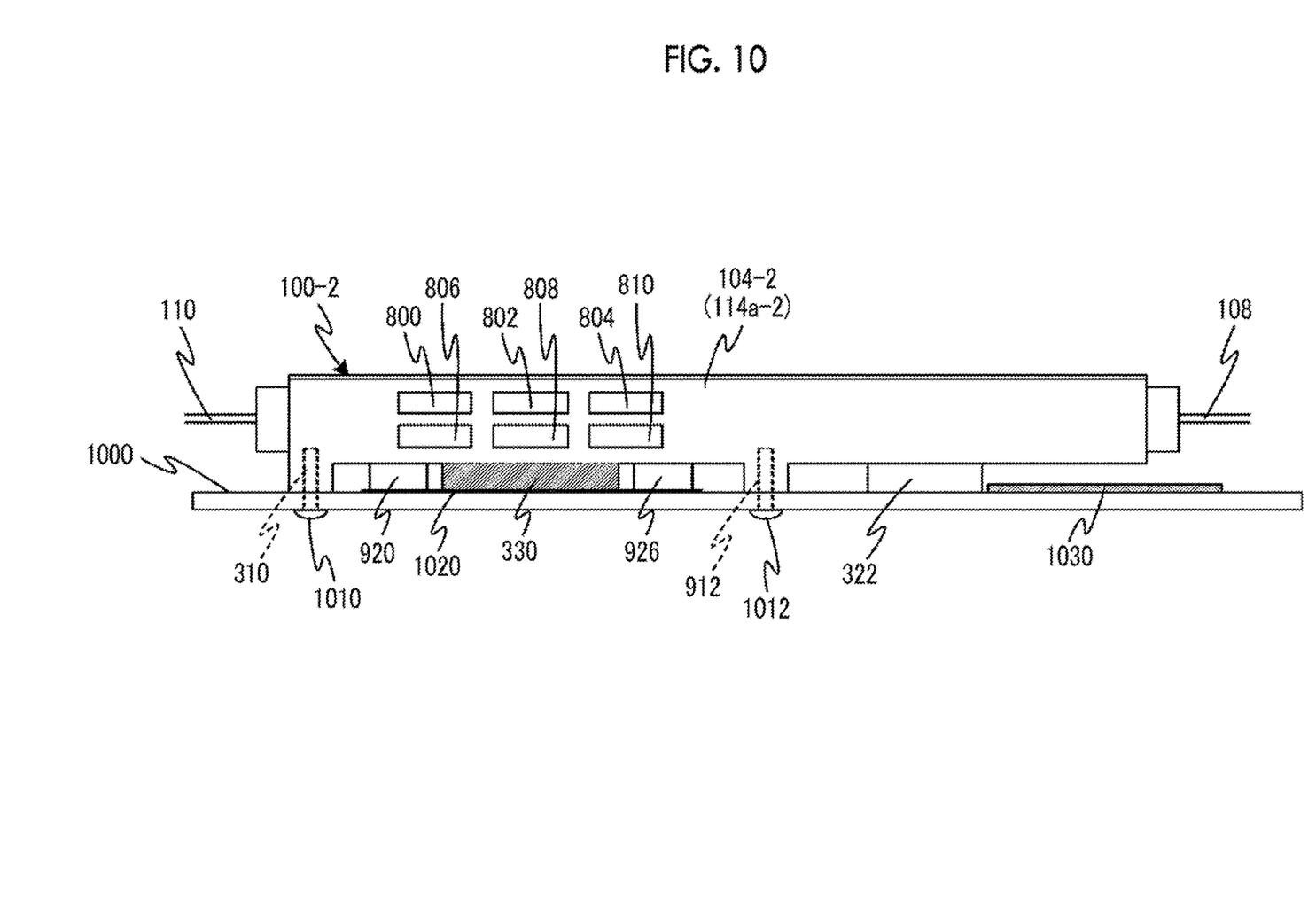
FIG. 10 is a diagram showing an example of mounting of the optical modulator according to the second modification example on the circuit board.

FIG. 10 is a diagram showing an example of mounting of the optical modulator 100-2 on the circuit board. In the illustration, the optical modulator 100-2 is fixed to a circuit board 1000 by four screws 1010, 1012, and the like (the other two screws are not shown) by using the four screw holes 310, 912, and the like of the package case 104-2.

In the illustrated example, the heat generated from the termination resistors 160 and the like in the optical modulator 100-2 is efficiently dissipated not only from the protrusion portion 330 but also from the protrusion portions 920 and the like to a conductor pattern 1020 formed on the circuit board 1000, and is also dissipated to the surrounding air.

In this modification example, the protrusion portions 820 and the like provided at the package case 104-2 act as radiation fins. However, there is no limitation thereto. For example, instead of or in addition to the protrusion portions 820 and the like, a structure that increases the surface area of the package case 104-2, such as a recess portion or a groove, may be provided in the package case 104-2, and thus the structure such as a recess portion or a groove and/or the protrusion portions 820 and the like may act as radiation fins.

Further, the protrusion portions 820 and the like or the structure such as a recess portion or a groove, which act as radiation fins, may be provided on at least one of the surfaces other than the bottom surface of the package case 104-2 on which the protrusion portion 330 for dissipating the heat from the termination resistors 160 and the like or the termination resistor board 170 is provided, in the package case 104-2. Further, these structures (including the protrusion portions 820 and the like) are not limited to the positions shown in FIGS. 7, 8, and 9, and may be concentratedly disposed at any portion of the package case 104-2 where it is expected that the heat-generation electronic components are disposed adjacent to each other, or be provided on the entire surface of the package case 104-2.

Second Embodiment

Next, a second embodiment of the present invention will be described. This embodiment relates to an optical transmission device equipped with any one of the optical modulator 100 according to the first embodiment and the optical modulators 100-1 and 100-2 according to the first and second modification examples described above.

Figure 11:
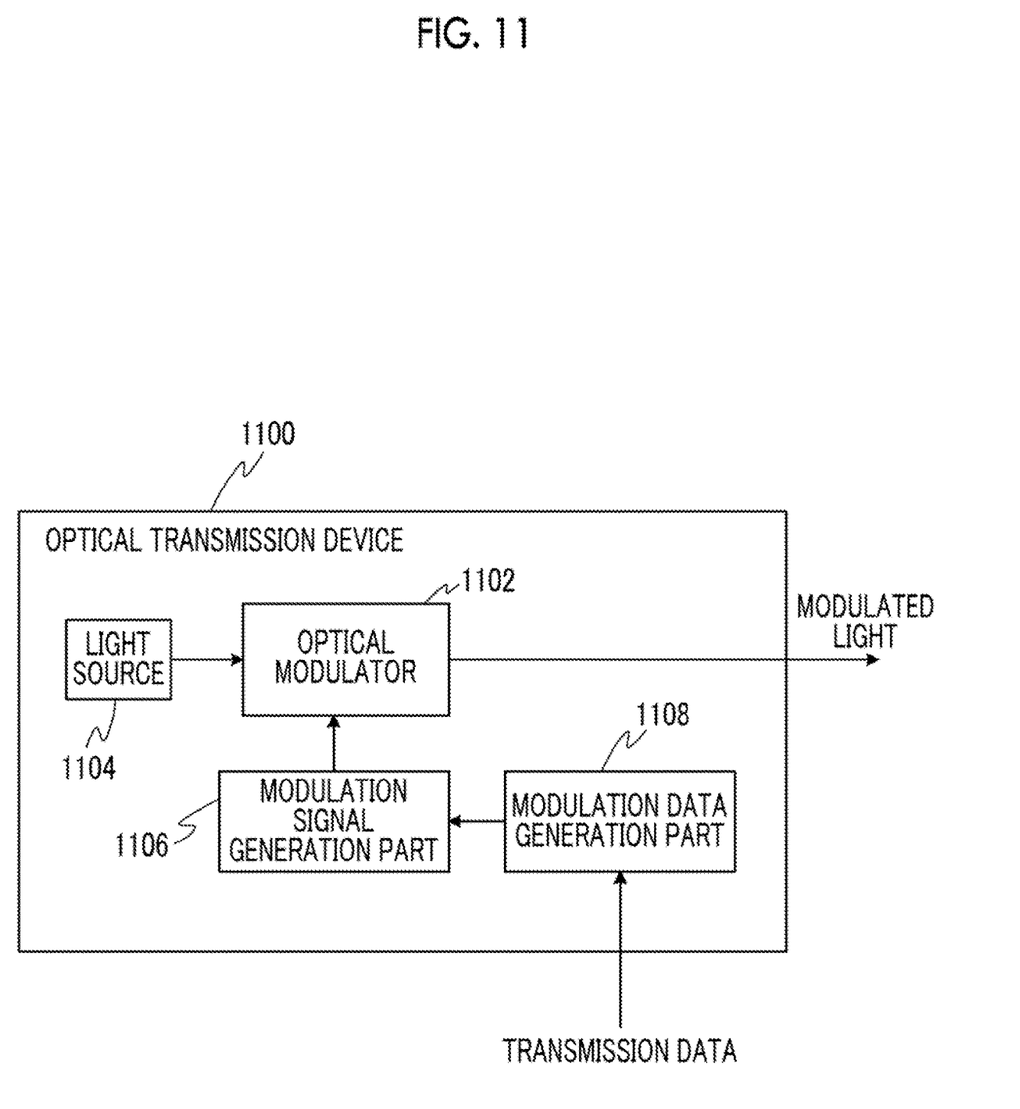
FIG. 11 is a diagram showing a configuration of an optical transmission device according to a second embodiment of the present invention.

FIG. 11 is a diagram showing the configuration of an optical transmission device 1100 according to this embodiment. The optical transmission device 1100 includes an optical modulator 1102, a light source 1104 for inputting light to the optical modulator 1102, a modulation signal generation part 1106, and a modulation data generation part 1108.

The optical modulator 1102 may be any one of the optical modulators 100, 100-1, and 100-2 according to the first embodiment described above, and the first and second modification examples described above. However, in the following description, in order to avoid redundant description and facilitate understanding, it is assumed that the optical modulator 100 according to the first embodiment is used as the optical modulator 1102.

The modulation data generation part 1108 receives transmission data which is provided from the outside, generates modulation data (for example, data obtained by converting or processing the transmission data into a predetermined data format) for transmitting the transmission data, and outputs the generated modulation data to the modulation signal generation part 1106.

The modulation signal generation part 1106 is an electronic circuit (including, for example, a radio frequency driver) that outputs an electric signal for causing the optical modulator 1102 to perform a modulation operation, and generates a modulation signal which is a radio frequency signal for causing the optical modulator 1102 to perform an optical modulation operation according to the modulation data, based on the modulation data output from the modulation data generation part 1108, and inputs the generated modulation signal to the optical modulator 1102. The modulation signal is composed of four RF signals corresponding to the four RF electrodes 150, 152, 154, and 156 of the optical modulation element 102 included in the optical modulator 100 which is the optical modulator 1102.

The four RF signals are respectively input to the four lead pins 120, 122, 124, and 126 of the optical modulator 100, which is the optical modulator 1102, and respectively applied to the RF electrodes 150, 152, 154, and 156 through the conductor patterns 140, 142, 144, and 146 on the relay boards 130 and 132.

In this way, the light output from the light source 1104 is modulated by the optical modulator 1102 and becomes modulated light, which is output from the optical transmission device 1100.

In particular, in the optical transmission device 1100, any one of the optical modulators 100, 100-1, and 100-2 according to the first embodiment and the first and second modification examples described above is used as the optical modulator 1102, and therefore, it is possible to efficiently dissipate heat generated from the termination resistors 160 and the like in the optical modulator, and to secure stable, highly reliable, and good optical modulation characteristics. As a result, in the optical transmission device 1100, it is possible to realize stable, highly reliable, and good transmission characteristics.

As described above, the optical modulator 100 according to the embodiment of the present invention includes the optical modulation element 102 that includes an optical waveguide and the radio frequency electrodes 150 and the like that control the light waves propagating through the optical waveguide. Further, the optical modulator 100 includes the termination resistors 160 and the like electrically connected to the radio frequency electrodes 150 and the like, the termination resistor board 170 on which the termination resistors 160 and the like are disposed, and the package case 104 that houses the optical modulation element and the termination resistor board. Then, a plurality of protrusion portions are formed on, for example, the bottom surface, which is one external surface, of the package case 104, and at least one protrusion portion 300 is formed at the position on the external surface of the package case 104, the position opposite to the position inside the package case 104 where the termination resistor board 170 is disposed with the package case 104 in between.

According to this configuration, it is possible to effectively dissipate the heat generated from the inside of the optical modulator 100 due to the termination resistors 160 and the like mounted inside the optical modulator 100.

Further, the protrusion portion 300 of the optical modulator 100 may be composed of one or a plurality of protrusion portions formed at the positions on the external surface (for example, the bottom surface) of the package case 104, the positions opposite to the respective positions of the termination resistors 160 and the like disposed on the termination resistor board 170 inside the package case 104, with the termination resistor board 170 and the package case 104 in between.

According to this configuration, one or a plurality of protrusion portions are provided in accordance with the disposition of the individual termination resistors in the package case 104, and therefore, heat dissipation can be performed more effectively.

Further, in the optical modulator 100, the protrusion portion 300 may be made of a material having a lower thermal resistance value than the package case 104. According to this configuration, the heat generated from the termination resistors 160 and the like can be immediately led to the protrusion portion 300 without being diffused, and be dissipated to the outside of the package case 104.

Further, as the modification example of the optical modulator 100, in the optical modulator 100-2, the protrusion portions 800 and the like are formed on the other external surface of the package case 104-2, which is adjacent to the bottom surface which is the one external surface on which the protrusion portion 300 is provided. Further, the protrusion portion 800 can be replaced with a recess portion. According to this configuration, the protrusion portions 800 and the like act as radiation fins, and the package case 104-2 functions as a radiator.

Further, in the optical modulator 100-1 which is the first modification example of the optical modulator 100, the protrusion portion 300, which is at least one protrusion portion, is provided with the screw holes 500 and the like. According to this configuration, the heat which is released from the protrusion portion 300 to the outside of the package case 104-1 can be transmitted to the conductor pattern on, for example, the rear surface of the circuit board (the surface facing the surface on which the optical modulator 100-1 is mounted) through the screws inserted into the screw holes 500 and the like. In this way, the degree of freedom of design of a heat transmission path can be improved, and more effective heat dissipation can be performed.

Further, the present invention relates to the optical transmission device 1100 including the optical modulator 100 or the like. According to this configuration, it is possible to efficiently dissipate the heat generated from the termination resistor 160, and to secure stable, highly reliable, and good optical modulation characteristics and realize good transmission characteristics.

Further, the present invention relates to the optical transmission device 1100 including the optical modulator 100 or the like, in which the optical modulator 100 or the like is mounted such that one of the protrusion portion 330 and the protrusion portions 920, 924, 926, 928, and 930 is in contact with the conductor pattern 1020 formed on the circuit board 1000 on which electronic components are mounted. According to this configuration, it is possible to more efficiently dissipate the heat generated from the termination resistor 160.

Further, the present invention relates to the optical transmission device 1100 including the optical modulator 100-1, in which the optical modulator 100-1 is mounted such that any of the screws 614 and the like connected to the screw holes 500, 502, 504, 506, 508, 510, 512, and 514 is in contact with the conductor pattern 632 formed on the back surface of the circuit board 600 on which electronic components are mounted. According to this configuration, it is possible to more efficiently dissipate the heat generated from the termination resistor 160.

REFERENCE SIGNS LIST 100, 100-1, 100-2, 1102: optical modulator
102: optical modulation element
104, 104-1, 104-2: package case
108, 110: optical fiber
114a, 114a-1, 114a-2: case
114b: cover
120, 122, 124, 126: lead pin
130, 132: relay board
140, 142, 144, 146, 420, 630, 632, 1020, 1320: conductor pattern
150, 152, 154, 156: RF electrode (radio frequency electrode)
160, 162, 164, 166: termination resistor
170: termination resistor board
300, 302, 304, 306, 320, 322, 330, 330-1, 800, 802, 804, 806, 808, 810, 820, 822, 824, 826, 828, 830, 902, 906, 920, 922, 924, 926, 928, 930: protrusion portion
310, 312, 314, 316, 500, 502, 504, 506, 508, 510, 512, 514, 912, 916: screw hole 350: center line
400, 600, 1000: circuit board
410, 412, 610, 612, 614, 616, 618, 620, 622, 1010, 1012: screw
1030: radio frequency driver
1100: optical transmission device
1104: light source
1106: modulation signal generation part
1108: modulation data generation part.

The invention claimed is:

1. An optical modulator comprising:
an optical modulation element which includes an optical waveguide and a radio frequency electrode for controlling light waves propagating through the optical waveguide;
a termination resistor electrically connected to the radio frequency electrode;
a termination resistor board on which the termination resistor is disposed; and
a package case which houses the optical modulation element and the termination resistor board,
wherein the package case is made of metal,
a plurality of protrusion portions extending from the metal of the package case are formed on one external surface of the package case, and
at least one of the protrusion portions abuts the package case at a position on the external surface, the position opposite to a position inside the package case where the termination resistor board is disposed with the package case in between, and
the at least one of the protrusion portions and the at least one other of the protrusion portions are configured to extend from the external surface by a same height.

2. The optical modulator according to claim 1, wherein the at least one of the protrusion portions is formed at a position on the external surface of the package case, the position opposite to a position of the termination resistor disposed on the termination resistor board inside the package case with the termination resistor board and the package case in between.

3. The optical modulator according to claim 1, wherein the at least one of the protrusion portions is made of a material having a lower thermal resistance value than the package case.

4. The optical modulator according to claim 1, wherein another external surface of the package case, which is adjacent to the one external surface, has a protrusion portion or a recess portion.

5. The optical modulator according to claim 1, wherein at least one of the protrusion portions is provided with a screw hole.

6. An optical transmission device comprising:
the optical modulator according to claim 5,
wherein the optical modulator is mounted such that any one of screws connected to the screw holes is in contact with a conductor pattern formed on a back surface of a substrate on which an electronic component is mounted.

7. An optical transmission device comprising:
the optical modulator according to claim 1.

8. The optical transmission device according to claim 7, wherein the optical modulator is mounted such that any one of the at least one of the protrusion portions is in contact with a conductor pattern formed on a substrate on which an electronic component is mounted.

9. The optical modulator according to claim 1, wherein at least one other of the protrusion portions includes a signal input terminal on the upper surface of said at least one other of the protrusion portions for inputting an electric signal to the radio frequency electrode.

* * * * *